July 14, 1953
A. C. HEEHLER
2,645,763
RAILWAY WARNING LIGHT CONTROL SYSTEM
Filed Feb. 26, 1949
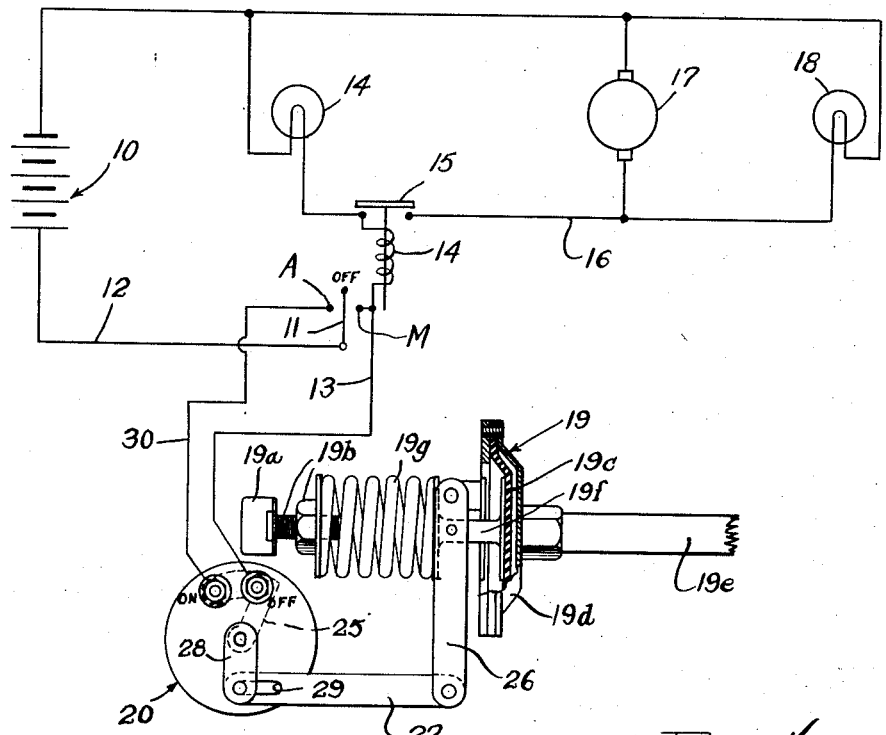
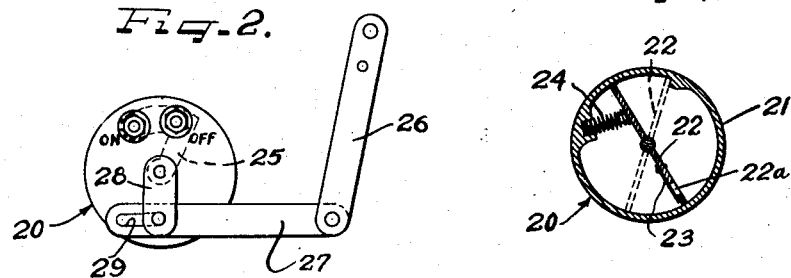
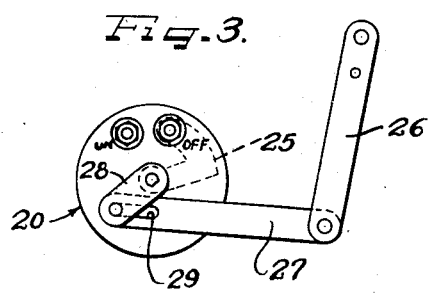
Inventor
ARTHUR C. HEEHLER
by The Firm of Charleswohills Attys.

UNITED STATES PATENT OFFICE 2,645,763

RAILWAY WARNING LIGHT CONTROL SYSTEM

Arthur C. Heehler, Chicago, Ill., assignor to The Pyle-National Company, Chicago, Ill., a corporation of New Jersey Application February 26, 1949, Serial No. 78,648

5 Claims. (Cl. 340—60)

This invention relates to a control system for a railway warning light, and more particularly, relates to a control system in the form of an electric circuit which contains a time delay mechanism in control thereof.

In a copending application of Thomas E. McDowell, entitled "Railway Warning Light Control System," Serial No. 68,599, filed December 31, 1948, assigned to the same assignee as the present invention, a railway warning light control system is disclosed wherein completely automatic operation of a railway warning light is attained through the use of inertia-responsive elements singly and in combination with pressure-responsive devices normally incorporated in the conduits of the fluid brake system of a vehicle. It may be noted that the instant invention was developed as an improvement of the railway warning light control system set forth in the aforesaid copending application.

Although the present invention may be understood to be of general utility, it is particularly applicable in the control of electric circuits embodied in vehicular apparatus, for example, the control of a railway warning light control system.

There is a particular need in the railroad industry today for the provision for adequate safety devices to safeguard the high-speed operation of trains running on shortened schedules. Accordingly, trains are sometimes provided with especially designed warning lights which can be operated in such a manner as to project a gyrating beam of light whenever the train slows down below a predetermined speed or comes to a stop. Thus, the engineer of a train proceeding on the same track behind the first train will be warned as soon as the second train comes within the range of the warning light.

Heretofore, warning lights having the aforementioned characteristics have been controlled in various ways. For example, control systems for warning lights have been provided which energize a circuit in response to variations in air pressure in the conduits of an air brake system. In the very early systems of this type, the light would go off when the air brake pressure was restored, even though the train was still at rest. Later, in systems which operated as a function of a reduction of air brake pressure, the light could be turned off only by a manually resetting operation. This latter type of system required the attendance of an operator and, of course, was also subject to the fallibility of human error.

In addition to the problems concerned with providing "through-trains" with adequate safety devices, the railroads have also been confronted with the problem of adequately safeguarding the operation of suburban trains which must, of course, operate on a schedule necessitating intermittent stopping and starting of a large number of trains operating at shortly spaced intervals along a single roadway.

Railway warning light control systems heretofore provided have been inadequate in solving the problems involved because the operation of a typical suburban train having control systems which operate as a function of air brake pressure or inertia results in an erratic operation of the warning light.

It is an object of this invention, therefore, to provide an improved control system for a railway warning light control circuit which is completely automatic in operation but which overcomes the disadvantages of the prior systems.

It is a further object of this invention to provide a control system responsive to relative changes in fluid pressure of an air brake system on a vehicle and including a time delay mechanism for controlling an electric circuit containing a warning light or other device to be controlled.

Another object of this invention is to provide a warning light control circuit on a movable vehicle of the type having fluid operated brakes whereby a warning light will be energized in response to a variation of brake fluid pressure from a predetermined normal quantitative value and a time delay mechanism will be simultaneously set for actuation to de-energize the warning light upon the completion of a predetermined time cycle.

A further object of this invention is to provide a time delay mechanism for a railway warning light control system which is adapted to be rendered inoperative despite completion of a predetermined time cycle if the brake fluid pressure of the vehicular system varies from a predetermined normal quantitative value.

Another object of this invention is to provide a novel method of controlling a warning light circuit of the type described.

It is believed that my novel method will be understood from the description of the apparatus herein provided for practicing the same. For a more complete understanding of the present invention, reference may be had to the following detailed description of the accompanying drawings from which many other objects and advantages will become apparent to those skilled in the art.

On the drawing:

Figure 1 is a wiring diagram illustrating the principles of my invention as they are applied, by way of example, to a typical installation of a railway train warning light control system, and further includes a diagrammatic front elevational view, partly broken, and partly in section, of a pressure-responsive device and a time delay mechanism associated therewith.

Figure 2 is a fragmentary view showing a sequential operational position of the device shown in Figure 1.

Figure 3 is a view similar to Figure 2 showing an additional operational position.

Figure 4 is a fragmentary cross-sectional view of the time delay device shown in Figure 1 illustrating the operational principles thereof.

As shown on the drawing:

Referring specifically to the drawing, an electric circuit is shown which may be energized by a suitable source of power indicated generally at 10. A three-position selector switch 11 is interposed in a conductor 12 leading from the source 10. In the middle position, the switch 11 is "off"; when turned to the position "A," the circuit is on "automatic" operation; and when turned to the position "M," the circuit is on "manual" operation.

By turning the switch 11 to the position "M," current is caused to flow from the source 10 through the lead 12 through the switch 11 and into a lead 13. A series relay 14 connected in the lead 13 is thereby energized and operates to energize a bulb 14. At the same time, the series relay 14 operates to actuate a switch 15 interposed in a lead 16 returning to the source 10, thereby completing the circuit of manual operation and energizing a motor 17 and a pilot light 18 associated with the motor 17. The motor 17 is connected to a suitable operating means provided to cooperate with the bulb 14, thereby causing a beam of projected light to gyrate or oscillate in a desired manner.

By turning the selector switch 11 to the automatic position "A," control of the electric circuit reposes in the control mechanism about to be described.

As may be seen on the drawing, the control mechanism includes a pressure-responsive device indicated generally by the reference numeral 19. By way of example only, the pressure-responsive device 19 is shown as comprising a support member 19a which may be affixed to a relatively stationary object such as the vehicle frame and has affixed thereto an adjustable bolt and nut assembly 19b.

The device 19 is further provided with a conventional diaphragm 19c which is enclosed in a pressure chamber enclosure 19d. The chamber of the enclosure 19d may be placed in communication with the air brake system of the vehicle through a conventional conduit member 19e.

A reciprocating piston 19f is situated within the pressure-responsive device 19 in such a manner as to lie in abutting assembly with the diaphragm 19c and is adapted to be actuated thereby upon movement of the same.

The pressure-responsive device 19 is adapted to cooperate with a time delay mechanism indicated generally by the reference numeral 20. Although the time delay mechanism 20 may take any conventional form, it is herein shown, by way of example, as comprising a dashpot mechanism.

As may be most clearly seen on Figure 4, the time delay mechanism 20 may include a hollow cylinder 21 with a pivoted vane 22 centrally disposed and arranged to be angularly displaced therein. As will be readily understood by those versed in the art, the vane 22 may be provided with an aperture 22a and an adjustable restricting member 23. A resilient member 24 may be arranged within the cylinder 21 so as to normally bias the vane 22 in a given direction. The cylinder 21 may be filled with a suitable hydraulic medium so that when the vane 22 is angularly displaced, a predetermined time interval will elapse before the resilient member 24 can bias the vane 22 against the hydraulic pressure in the cylinder 21 to its original position.

The time delay mechanism is provided with a pair of electrical contact points which are labeled for the purpose of identification by the words "on" and "off." A lever arm 25 is mounted in firm assembly with the pivot pin of the vane 22 so as to move in fixed relation therewith. The lever arm 25 may be made of a suitable conducting material and may further be arranged so as to complete the electrical circuit between the contact points of the time delay mechanism when the mechanism is set in operation.

A linkage arrangement is provided between the time delay mechanism 20 and the pressure-responsive device 19 and, as shown on the drawing, comprises a lever arm 26 pivotally secured to the frame of the pressure-responsive device 19. The lever arm 26 is provided with a suitable pin connection to the piston member 19f so as to permit an oscillatory movement thereof in response to pressure displacement of the diaphragm 19c.

A second lever arm 27 is pivotally connected to the lever arm 26 and is further provided with a longitudinally disposed slot 29 on one end for sliding pivotal connection to a third lever arm 28.

The lever arm 28 is firmly connected with the pivot pin of the vane 22 and may be provided with a stud pin receivable in the slot 29.

It will be understood, of course, that the bias of the spring 19g may be selectively adjusted so as to have the pressure-responsive device 19 respond to any given variation from a predetermined normal pressure of a quantitative value normally maintained in the conduits of the air brake system.

The operation of the instant apparatus may be best understood by comparing the sequential steps illustrated in Figures 1, 2 and 3.

As may be seen in Figure 1, when a variation has occurred in the fluid pressure of the air conduit in the vehicular brake system, the spring 19g urges the piston 19f rightwardly against the reduced pressure bias exerted upon the diaphragm 19c. In this position, the lever arm 26 also pivots rightwardly and carries the lever arm 27 to the position shown. Thus, the lever arm 28 operates to actuate the vane 22 against the spring bias of the resilient member 24 and simultaneously moves the arm 25 thereby closing the circuit from the source 10 through the lead 12 and into the lead 30 connected to the "on" contact, through the arm 25 and into the lead 13.

If pressure is again restored within the air brake system, the piston 19f will be actuated leftwardly and the linkage will be moved to the position shown on Figure 2. In this position, the lever arm 28 is not actuated by virtue of the sliding lost-motion action produced by the coaction of the lever arm 28 and the slot 29 of the lever arm 27. Thus, the operating arm 25 will remain in the closed circuit condition until the time cycle of the time delay mechanism 20 has been completed.

Upon the completion of the time cycle, the linkage will assume the position shown in Figure 3. In this position, the vane 22 has moved to the dotted line position shown in Figure 4, and the lever arm 28 has been pivotally rotated through the limits prescribed by the slot 29 thereby permitting a corresponding rotative movement of the operating arm 25 to the "off" position, thereby breaking the circuit and deenergizing the various elements of the warning light.

If the pressure in the conduits of the fluid brake system is not restored to normal, the linkage will remain in the position shown in Figure 1, and the electric circuit will remain closed despite initiation of the time delay cycle because the lever arm 28 will hold the operating arm 25 in the "on" position.

It will be apparent that the time delay mechanism may be adapted to reflect a suitable time cycle representative of the average stopping period experienced, for example, by a suburban train.

It will be apparent to those skilled in the art that I have described a novel and improved apparatus for controlling the operation of a vehicular warning light and a novel method of control practiced thereby. It will be further apparent that various details of the present invention may be subjected to modification without departing from the spirit thereof. Therefore, it should be understood that the embodiment herein disclosed is not to be construed as a limitation.

I claim as my invention:

1. In a warning light control system for a movable vehicle having a fluid operated brake system, a warning light, circuit means to control the energization of said warning light, a switch in control of said circuit means, an actuating device in said brake system having a movable member responsive to variations from a predetermined normal reference pressure in said brake system, said movable member connected to said switch to hold said switch closed whenever said pressure varies from a predetermined normal reference pressure, and a time delay device connected to said switch and arranged to be actuated by said member to initiate a time cycle, said time delay device arranged to open said switch only after completion of a predetermined time cycle, said movable member arranged to render said time delay device inoperative upon failure of said pressure to return to normal reference value.

2. In a warning light control system for a movable vehicle as defined in claim 1, adjustment means for said time delay device to selectively vary the length of the time cycle.

3. In combination with a vehicle carried electric warning signal, an energization circuit means for energizing the electric warning signal, a first control switch means in control of said energization circuit means, holding circuit switch means for maintaining said energization circuit means closed including a second control switch means in control of said holding circuit means for opening said energization circuit means and conditioning said apparatus for energizing the electric warning signal again by said first switch means, and a time delay mechanism operatively connected to said second control switch means to deenergize the electric warning signal only after completion of a predetermined time cycle, and a pressure-responsive actuating means operatively connected to both of said switch means to simultaneously energize said signal and initiate said time cycle in response to a pressure variation.

4. In combination with a vehicle carried electric warning signal, an energization circuit means for energizing the electric warning signal, a first control switch means in control of said energization circuit means, holding circuit switch means for maintaining said energization circuit means closed including a second control switch means in control of said holding circuit means for opening said energization circuit means and conditioning said apparatus for energizing the electric warning signal again by said first switch means, and a time delay mechanism operatively connected to said second control switch means to deenergize the electric warning signal only after completion of a predetermined time cycle, and actuating means operatively connected to both of said switch means to simultaneously energize said signal and initiate said time cycle in response to an acceleration of the vehicle.

5. In combination with a vehicle carried electric warning signal, an energization circuit means for energizing the electric warning signal, a first control switch means in control of said energization circuit means, holding circuit switch means for maintaining said energization circuit means closed including a second control switch means in control of said holding circuit means for opening said energization circuit means and conditioning said apparatus for energizing the electric warning signal again by said first switch means, and a time delay mechanism operatively connected to said second control switch means to deenergize the electric warning signal only after completion of a predetermined time cycle, and fluid operated brakes for said vehicle, and pressure-responsive actuating means operatively connected to both of said switch means to simultaneously energize said signal and initiate said time cycle in response to a variation of brake fluid pressure from a predetermined normal quantitative value.

ARTHUR C. HEEHLER.

References Cited in the file of this patent
UNITED STATES PATENTS

| Number | Name | Date |
| --- | --- | --- |
| 913,974 | Bettey | Mar. 2, 1909 |
| 952,070 | Cota | Mar. 15, 1910 |
| 983,861 | Pool | Feb. 7, 1911 |
| 1,214,624 | Whitcomb | Feb. 6, 1917 |
| 1,578,170 | Reiber | Mar. 23, 1926 |
| 1,913,699 | Crago | June 13, 1933 |
| 1,950,301 | Hall et al. | Mar. 6, 1934 |
| 2,235,123 | Stubbins | Mar. 18, 1941 |
| 2,439,474 | Kennelly | Apr. 13, 1948 |
| 2,456,286 | Kennelly | Dec. 14, 1948 |